United States Patent Office 3,080,290
Patented Mar. 5, 1963

3,080,290
RECOVERY OF ALKALI-METAL SALTS OF HEPARIN FREE OF AMMONIA
Robert Thomas Shane, Portage Township, Kalamazoo County, and Cornelius Vander Kolk, Kalamazoo, Mich., assignors to The Upjohn Company, Kalamazoo, Mich., a corporation of Delaware
No Drawing. Filed Mar. 15, 1962, Ser. No. 180,012
4 Claims. (Cl. 167—74)

The present invention relates to a novel process for the preparation of alkali-metal salts of heparin substantially free of ammonia.

Most heparin preparations contain a certain quantity of ammonia which is apparently attributable to the techniques used in the isolation and purification of heparin from animal tissue. Ammonia-containing alkali-metal salts of heparin, e.g., the sodium, potassium, and like alkali-metal salts, are not normally considered as inferior products when utilized as anticoagulants. However, in some instances heparin is also routinely utilized in blood ammonia determinations in clinical medicine and research (Conn, New England Journal of Medicine, 262, 1103, 1960). Under such routine usage the varying quantity of ammonia does introduce an undesirable factor.

It has now been found that the ammonia content of alkali-metal salts of heparin can be substantially reduced by distilling an aqueous solution of ammonia-containing alkali-metal salt of heparin under reduced pressure in the presence of an inert gas until the solution is substantially ammonia free, precipitating and separating the alkali-metal salt of heparin from the solution, and then drying the salt under reduced pressure in the presence of an inert gas, to obtain a solid, dry, substantially ammonia-free alkali-metal salt of heparin. The importance of the drying step under reduced pressure in the presence of an inert gas is cogently demonstrated by the fact that substitution of air for the inert gas results in a product which is undesirably high in ammonia content, even though the ammonia content had been reduced to a satisfactory level in the distillation step.

The term "solid, dry, substantially ammonia-free alkali-metal salt of heparin" is herein intended to define a salt which contains not more than about 50 micrograms of ammonia-nitrogen per gram of solid, dry salt. Ordinarily in the practice of the invention, the ammonia-nitrogen content of the solid, dry salt is even lower than 50 micrograms and frequently can be lowered to such an extent that no ammonia-nitrogen is detected by assay.

The process of the present invention involves (1) dissolving the ammonia-containing alkali-metal salt of heparin in an aqueous medium; (2) adjusting the pH of the solution to between about 9.0 and about 12.0, preferably about 10.0; (3) distilling the mixture in the presence of an inert gas under a reduced pressure of from between about 1 and about 70 mm. of mercury, preferably between about 25 and about 35 mm. of mercury, at a temperature of between about zero and about 45° C., preferably between about 25 and about 35° C., until the solution is substantially free of ammonia; (4) adjusting the pH of the remaining solution to between about 5.5 and about 7.0, preferably between about 6.0 and about 6.5; (5) cooling the solution to between about zero and about 15° C., preferably between about zero and about 5° C.; (6) adding a water-miscible organic solvent to the solution containing a water-soluble, dissociated salt while maintaining the temperature of the solution between about zero and about 15° C., preferably between about 5° C., to precipitate the alkali-metal salt of heparin substantially free of ammonia; (7) separating the precipitate; and (8) drying the precipitate in the presence of an inert gas at a temperature of between about 30 and about 45° C., preferably about 40° C., at a pressure of from between about 1 and about 100 mm. of mercury, preferably between about 25 and about 50 mm. of mercury.

Occasionally it may be that loss of ammonia from the distilland, brought about by distillation under reduced pressure as set forth in step (3) above, is not sufficient, as can readily be ascertained by making a routine ammonia-nitrogen assay on an aliquot of the distilland. This is infrequent but possible, particularly when the ammonia content of the starting alkali-metal salt of heparin is extraordinarily great. In such case, the distillation under reduced pressure can be continued in order to remove an additional quantity of ammonia; alternatively, water can be added to the pot as make-up and distillation continued as before. It will of course be understood that all materials employed herein (other than the starting heparin salt), including water, substances used for the adjustment of pH, water-soluble dissociable salts, water-miscible organic solvents, and inert gases, should be as nearly ammonia-free as possible.

The weight ratio of the ammonia-containing alkali-metal salt of heparin to water in the starting aqueous solution can vary over a wide range, such as from about 1:20 to about 1:100, particularly from about 1:20 to about 1:40, and preferably is about 1:30.

As noted above, the distillation and drying steps are carried out in the presence of an inert gas, for example, nitrogen, helium, argon, neon, and the like, nitrogen being preferred for economic reasons.

The water-soluble, dissociable salt is added for the purpose of facilitating the precipitation of the alkali-metal heparin salt on the addition of the water-miscible organic solvent. Water-soluble salts which can be employed include the alkali-metal citrates, halides, acetates, or sulfates, or alkaline-earth halides, acetates or citrates, and the like, sodium chloride ordinarily being preferred. The salt is employed in amounts ranging from about 0.5% to about 2.0% of the solution, by weight, preferably from about 0.75% to about 1.0% of the solution, by weight.

Since the purpose of the water-soluble, dissociable salt is to assist in the precipitation of the alkali-metal heparin salt, it can be added at any point in the process prior to the addition of the water-miscible organic solvent. Illustratively, the salt can be added to the aqueous solution of ammonia-containing alkali-metal salt of heparin prior to distillation, or subsequent to the distillation but before the addition of the organic solvent. Water-miscible organic solvents which can be employed include, for example, acetone, dioxane, lower-alkanols such as methanol, ethanol, isopropanol, and the like. The water-miscible organic solvent is employed in amounts ranging from about 40% to about 60% of the solution, by volume, particularly from about 40% to about 50% of the solution, by volume, and preferably is about 45% of the solution, by volume.

The pH adjustments in steps (2) and (4) above are made in a conventional manner. Thus the alkaline conditions set forth in step (2) can be brought about by means of alkali-metal hydroxides and carbonates such as sodium and potassium hydroxides and carbonates, alkaline citrates and phosphates such as sodium citrate, trisodium phosphate, and like alkalinizing agents. Likewise the acidic to neutral conditions set forth in step (4) can be brought about by means of acids such as hydrochloric, sulfuric, phosphoric, tartaric, citric and acetic acids, acid tartrates and phosphates such as potassium hydrogen tartrate, sodium and potassium dihydrogen phosphates, and like acidifying agents.

The following example is illustrative of the process of the present invention and is not to be construed as limiting.

*Example*

3855 g. of ammonia-containing sodium salt of heparin (ammonia-nitrogen assay=352 micrograms/g.; heparin assay=119 U.S.P. units/mg.) was dissolved in 115.6 liters of water to which was added 1040 g. of sodium chloride (0.9% of the solution by weight). The pH of the solution was adjusted to 10.0 with 10% aqueous sodium hydroxide solution and the solution was then distilled at a pressure of approximately 30 mm. of mercury at a temperature of approximately 30° C. for 2.5 hr., in the presence of a nitrogen stream; (ammonia-nitrogen assay=0.000735 mg./ml.=57 mg. total). The solution was filtered through acid-washed, lint-free paper and the filter was washed with about 4.0 liters of water. The pH of the solution (including the wash water) was then adjusted to 6.2 with dilute hydrochloric acid (prepared by diluting one volume of concentrated hydrochloric acid with three volumes of water) and cooled to between zero and 5° C. To the solution (volume=82.0 liters) was added sufficient acetone to make the solution 45% by volume with respect to acetone. The solution was maintained between zero and 5° C. for 16 hr. and filtered to recover the precipitated sodium salt of heparin. This product was washed with acetone and dried at a pressure of approximately 30 mm. of mercury at 40° C. for 48 hr. in the presence of a nitrogen stream. The dried sodium salt of heparin weighed 3450 g. (ammonia-nitrogen assay=zero; heparin assay=123 U.S.P. units/mg.).

We claim:

1. A process for the recovery of alkali-metal salts of heparin substantially free of ammonia which comprises the steps of distilling an aqueous solution of ammonia-containing alkali-metal salt of heparin under reduced pressure in the presence of an inert gas until the solution is substantially ammonia-free, separating the substantially ammonia-free alkali-metal salt of heparin from the solution, and drying the salt under reduced pressure in the presence of an inert gas.

2. A process for the recovery of alkali-metal salts of heparin substantially free of ammonia which comprises the steps of:
   (1) distilling an aqueous solution of ammonia-containing alkali-metal salt of heparin under reduced pressure in the presence of an inert gas at a temperature of between about zero and about 45° C. and at a pH of between about 9.0 and about 12.0 until the solution is substantially ammonia-free,
   (2) adjusting the pH of the remaining solution to between about 5.5 and about 7.0,
   (3) cooling the solution to between about zero and about 15° C.,
   (4) adding a water-miscible organic solvent to the solution containing a water-soluble, dissociated salt while maintaining the temperature of the solution between about zero and about 15° C. to precipitate the alkali-metal salt of heparin substantially free of ammonia,
   (5) separating the precipitate, and
   (6) drying the precipitate under reduced pressure in the presence of an inert gas at a temperature of from between about 30 and about 45° C.

3. The process of claim 2 in which the water-miscible organic solvent is acetone and the water-soluble dissociated salt is sodium chloride.

4. A process for the recovery of alkali-metal salts of heparin substantially free of ammonia which comprises the steps of:
   (1) distilling an aqueous solution of ammonia-containing alkali-metal salt of heparin and a water-soluble, dissociated salt under reduced pressure in the presence of an inert gas at a temperature of between about zero and about 45° C. and at a pH of between about 9.0 and about 12.0 until the solution is substantially ammonia-free,
   (2) adjusting the pH of the remaining solution to between about 5.5 and about 7.0,
   (3) cooling the solution to between about zero and about 15° C.,
   (4) adding a water-miscible organic solvent to the solution while maintaining the temperature of the solution between about zero and about 15° C. to precipitate the alkali-metal salt of heparin substantially free of ammonia,
   (5) separating the precipitate, and
   (6) drying the precipitate under reduced pressure in the presence of an inert gas at a temperature of from between about 30 and about 45° C.

No references cited.